(12) United States Patent
Akhtar et al.

(10) Patent No.: US 8,725,128 B2
(45) Date of Patent: May 13, 2014

(54) PRE-FETCHING OF ASSETS TO USER EQUIPMENT

(75) Inventors: Shahid Akhtar, Richardson, TX (US); Philippe Laine, Issy-les-Moulineaux (FR)

(73) Assignee: Alcatel Lucent, Paris (FR)

( * ) Notice: Subject to any disclaimer, the term of this patent is extended or adjusted under 35 U.S.C. 154(b) by 461 days.

(21) Appl. No.: 12/964,923

(22) Filed: Dec. 10, 2010

(65) Prior Publication Data
US 2012/0149346 A1 Jun. 14, 2012

(51) Int. Cl.
*H04M 3/42* (2006.01)
*H04M 3/493* (2006.01)

(52) U.S. Cl.
USPC .................. 455/414.2; 455/414.1; 455/414.3; 455/414.4

(58) Field of Classification Search
USPC ............................................ 455/414.1–414.4
See application file for complete search history.

(56) References Cited

U.S. PATENT DOCUMENTS

| | | | | |
|---|---|---|---|---|
| 7,103,369 | B2 * | 9/2006 | Sato et al. ................... | 455/456.3 |
| 8,036,690 | B1 * | 10/2011 | Delker et al. ................. | 455/512 |
| 2005/0144221 | A1 | 6/2005 | Shin et al. | |
| 2008/0200161 | A1 * | 8/2008 | Morse et al. .................. | 455/418 |
| 2009/0187859 | A1 | 7/2009 | Tuerk et al. | |
| 2010/0198944 | A1 * | 8/2010 | Ho et al. ...................... | 709/217 |
| 2011/0136474 | A1 * | 6/2011 | Ren et al. .................. | 455/412.2 |

OTHER PUBLICATIONS

Werner Ruotsalainen: "The Multiplatform Podcasting/ Podcasting Bible", Aug. 28, 2008, pp. 1-19, XP002671657, retrieved from the internet: URL:http:/www.smartphonemag.com/cms/print/54357[retrieved on Mar. 16, 2012].

Werner Ruotsalainen: "The Multiplatform Podcasting/ Podcasting Bible—The Chart", Aug. 28, 2008, pp. 1-12, XP002671658, retrieved from the internet: URL:http:/www.winmobiletech.com/082008Podcasting/t.html [retrieved on Mar. 16, 2012].

Elina Vartiainen et al. Auto-update, PRoeceedings of the 4th International Conference on Mobile Technology, Applications, and Systems and the 1st International Symposium on Computer Human Interaction in Mobile Technology, Mobility '07, Jan. 1, 2007.

* cited by examiner

*Primary Examiner* — Charles Appiah
*Assistant Examiner* — Jaime Holliday
(74) *Attorney, Agent, or Firm* — Duft, Bornsen & Fettig, LLP

(57) ABSTRACT

Systems and methods are disclosed for pre-fetching assets from content providers to user equipment (UE). In one embodiment, the UE initiates a pre-fetch operation to download assets from content providers in advance of an end user requesting the assets. The UE accesses a resource profile for the pre-fetch operation that indicates the content providers that have assets for the UE to download in advance for local storage on the UE, and defines a percentage of UE resources allocated to each of the content providers for downloading the assets during the pre-fetch operation. The UE may then download the assets from the content providers based on the resource profile, and store the assets in a local memory.

18 Claims, 7 Drawing Sheets

PRE-FETCHING OF ASSETS TO USER EQUIPMENT

FIELD OF THE INVENTION

The invention is related to the field of communication systems and, in particular, to pre-fetching assets (e.g., video, audio, etc) to user equipment (UE).

BACKGROUND

Mobile networks (also referred to as wireless or cellular networks) include a plurality of base stations that use radio signals to communicate with mobile devices, which may be referred to User Equipment (UE). A base station includes transceivers (antennas) having a particular transmission range which form "cells" around the base station. When a UE comes into range of a cell of the base station, the UE is able to exchange radio signals with the base station. The base station in turn interfaces the UE with a core network that offers voice and/or data services to the UE. For example, the base station may interface the UE with an Evolved Packet Core (EPC) network of the Long Term Evolution (LTE) standards or another type of core network so that the UE may download content from websites.

As data services have emerged due to 3G and 4G technologies, the use of data services by subscribers has increased. For example, mobile subscribers tend to access data services, such as web surfing, email, etc., more than they use voice services. Data services allow end users to download content from content servers, some examples of which are Facebook, YouTube, NetFlix, etc. Network operators are faced with the problem of providing adequate bandwidth to its subscribers as the use of data services increases. The air interface of a mobile network may be a bottleneck for increasing bandwidth because there is a limited radio spectrum that may be used for communications. Thus, network operators look for ways to save bandwidth over the air interface.

SUMMARY

Embodiments described herein further optimize how the bandwidth of the air interface is utilized in a mobile network by downloading content to a UE in advance of an end user actually requesting the content. One technique that may be used to save bandwidth on the air interface is to predict content that may be requested by an end user of a UE, and download that content to the UE in advance of the request. For example, if there is a popular video on YouTube, then a system may predict that the end user is going to download the video at some point. Thus, the UE may download the video from the YouTube server in advance of the user requesting the video, and store the video in a local memory. If the end user of the UE requests to view the video at a later time, then the UE is able to retrieve the video from local memory instead of having to download the video from the YouTube server in real time. The UE may download the content at an optimal time (e.g., when there is low usage of the air interface, such as late at night), via a local wireless network (e.g., WiFi), or using a low priority (e.g., best efforts) so that the download has less of an effect on the air interface. Thus, the bandwidth of the air interface is used in a more intelligent manner by downloading the content in advance to the UE.

The process of downloading content to a UE in advance of an end user actually requesting or viewing the content is referred to as pre-fetching. A UE may be programmed or otherwise adapted to initiate a pre-fetch operation periodically, such as daily, weekly, etc. For a pre-fetch operation, the UE accesses a resource profile that is established for the end user of the UE, and the UE processes the resource profile to identify the content providers (e.g., websites) that have content (e.g., videos) for the UE to download in advance, and to determine how to allocate resources for downloading the content from the content providers. The content, such as video, audio, etc., is referred to generally herein as "assets". Thus, the resource profile for the UE indicates the content providers that have assets for the UE to download in advance for a pre-fetch operation. The resource profile also defines a percentage of UE resources (e.g., time spent downloading or memory) allocated to each of the content providers for downloading the assets during the pre-fetch operation. A percentage of UE resources allocated to a content provider may refer to the percentage allocated to the content provider itself (regardless of the type of asset downloaded) and/or may refer to the percentage of UE resources allocated per asset-type or per asset sub-type from the content provider. For example, the resource profile may indicate that 40% of UE resources are allocated to a first content provider during the pre-fetch operation (regardless of the type of asset being downloaded). The resource profile may also indicate that 20% of UE resources are allocated to the first content provider for video downloads, 15% of UE resources are allocated to the first content provider for audio downloads, and 5% of UE resources are allocated to the first content provider for digital picture downloads.

The UE may then download the assets from the content providers based on the resource profile, and store the assets in a memory. For example, the UE may download the assets over a mobile network (such as during low usage periods), over a local area network, etc. If an end user of the UE requests an asset that was downloaded in advance (pre-fetched), then the UE may retrieve the asset from the local memory instead of having to retrieve the asset over the network. Thus, the bandwidth of the network (e.g., the air interface) is used in a more intelligent manner by downloading the content in advance to the UE.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
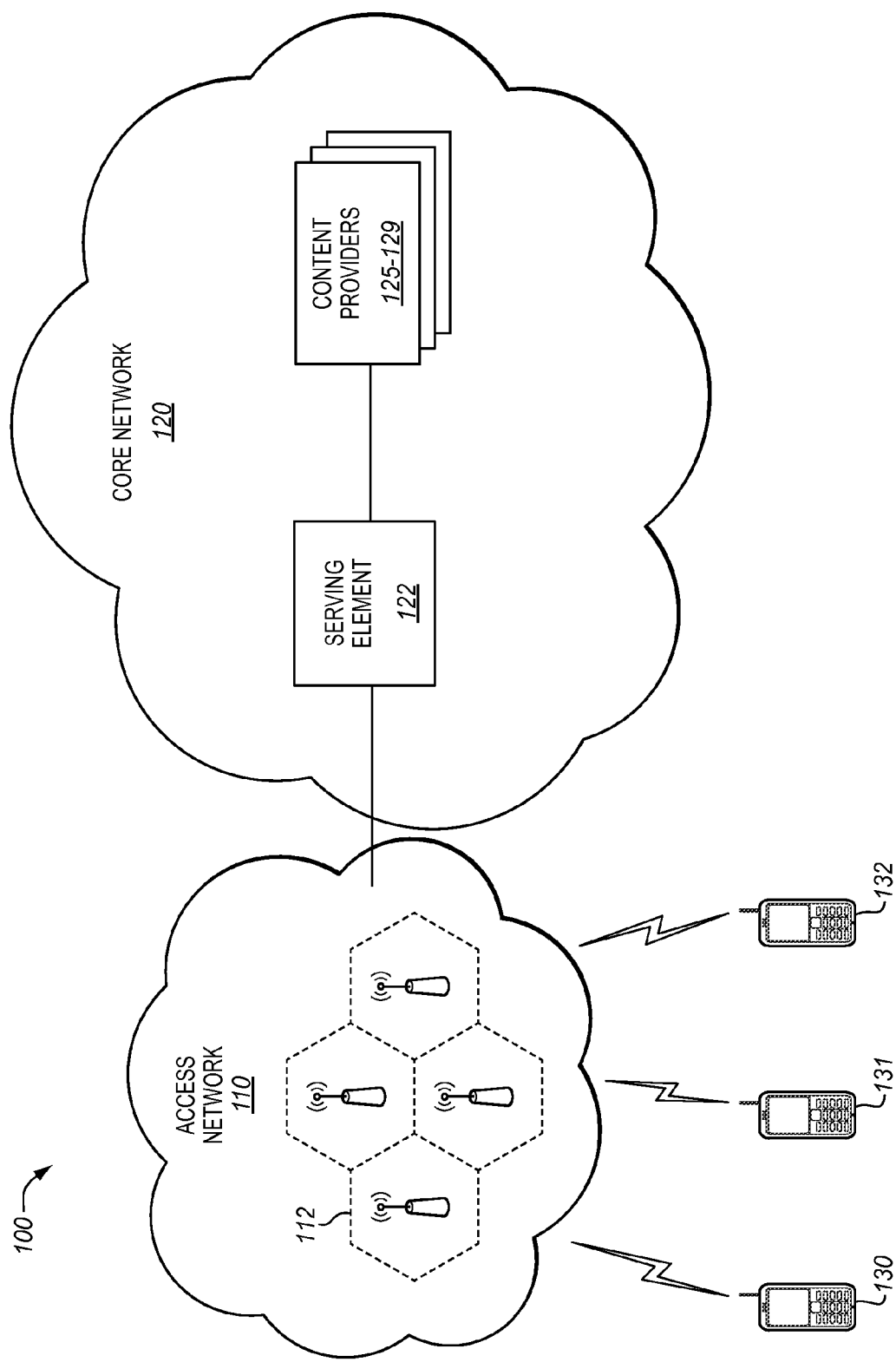
FIG. 1 illustrates a mobile network in an exemplary embodiment.

FIG. 1 illustrates a mobile network 100 in an exemplary embodiment. Mobile network 100 includes an access network 110 coupled to a core network 120. Access network 110 includes a plurality of base stations 112 (or other types of wireless access points) that exchange wireless or radio signals with UEs 130-132 using the over-the-air (OTA) interface. Core network 120 is the central part of the network that provides voice and/or data services to the UEs 130-132 that are connected by access network 110. Core network 120 may comprise a packet-switched core network, such as an Evolved Packet Core (EPC) of a Long Term Evolution (LTE) network, or may comprise any other type of core network.

Core network 120 includes one or more serving elements 122 and a plurality of content providers 125-129. Serving element 122 comprises any server or system operable to serve a UE accessing voice and/or data services. For example, serving element 122 may comprise a packet switch, a serving gateway (S-GW), a PDN Gateway (P-GW), or similar type of element. Content providers 125-129 comprise any servers or systems operable to store video, audio, digital pictures, files, or any other type of downloadable content. The content that is downloadable to a UE 130-132 is referred to herein as "assets". One example of a content provider 125-129 is a server which hosts a website having assets that are offered to a UE. For instance, a server may host the YouTube website which offers videos for download. Content providers 125-129 are shown as part of core network 120, which is merely to illustrate that content providers 125-129 are accessible to UEs 130-132 through core network 120. Content providers 125-129 may actually be separate from core network 120, and accessible through an appropriate gateway (not shown) within core network 120.

UEs 130-132 are each operable to communicate with access network 110 to receive services from core network 120. More particularly, UEs 130-132 are able to download assets from content providers 125-129 and/or upload assets to content providers 125-129. UEs 130-132 are mobile devices in this embodiment which use wireless or radio signals to communicate with access network 110.

Figure 2:
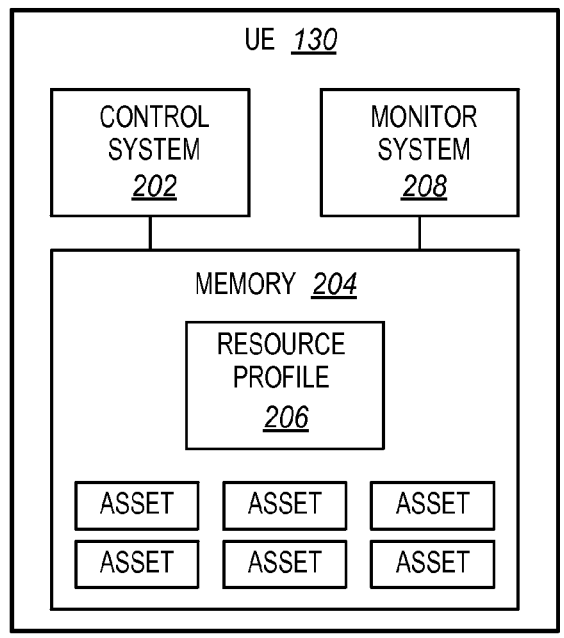
FIG. 2 illustrates user equipment (UE) in an exemplary embodiment.

FIG. 2 illustrates UE 130 in an exemplary embodiment. FIG. 2 shows an exemplary configuration of UE 130, and other UEs 131-132 in FIG. 1 may have similar configurations. UE 130 is programmed to execute a pre-fetch operation in order to download assets from content providers 125-129 in advance of an end user actually requesting the assets. UE 130 includes a control system 202, a memory 204, and a monitoring system 208. Control system 202 comprises any type of processor, device, or component that controls the operation of UE 130. Control system 202 may interface with a subscriber identity module (SIM) card or other type of programmable card which indicates the services subscribed to by the end user.

Memory 204 comprises any type of storage device that stores data. Memory 204 is able to store assets that are downloaded in advance by pre-fetch operations, and is also able to store a resource profile 206 for UE 130. Resource profile 206 indicates content providers 125-129 that have assets for UE 130 to download in advance during a pre-fetch operation. Resource profile 206 also defines a percentage of UE resources allocated to each of the content providers 125-129 for downloading the assets during the pre-fetch operation.

Monitoring system 208 comprises any device or component that is able to monitor types of access networks that are available to UE 130. For example, monitoring system 208 is able to determine when a WiFi, wireless LAN, or other type of broadband network is available to UE 130. Monitoring system 208 is also able to determine when a regular cellular network (e.g., 3G) is available to UE 130.

Figure 3:
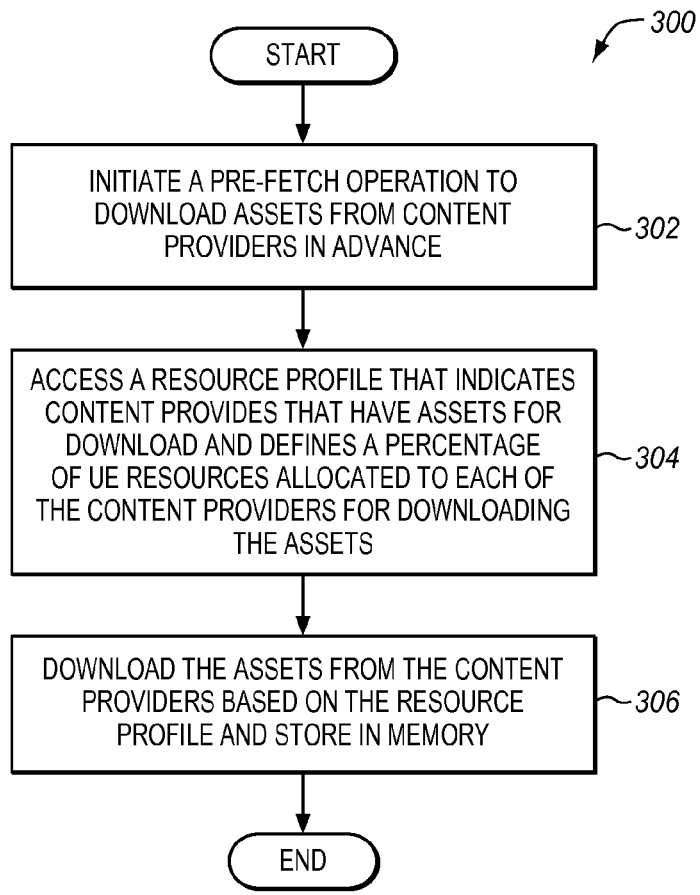
FIG. 3 is a flow chart illustrating a method of pre-fetching assets in an exemplary embodiment.

FIG. 3 is a flow chart illustrating a method 300 of pre-fetching assets in an exemplary embodiment. The steps of method 300 will be described with reference to UE 130 in FIGS. 1-2, but those skilled in the art will appreciate that method 300 may be performed in other systems or devices. The steps of the flow charts described herein are not all inclusive and may include other steps not shown. The steps may also be performed in an alternative order.

In step 302, control system 202 initiates a pre-fetch operation to download assets from content providers 125-129. Initiation of the pre-fetch operation may be triggered by a number of conditions. One condition may be time and/or day. For example, the pre-fetch operations may be performed at night on certain days. Another condition may be the availability of a broadband network to UE 130, which is further described in FIG. 9. Other conditions may trigger the pre-fetch operation, such as a request from the network, an indication of low congestion on the network, etc.

Figure 4:
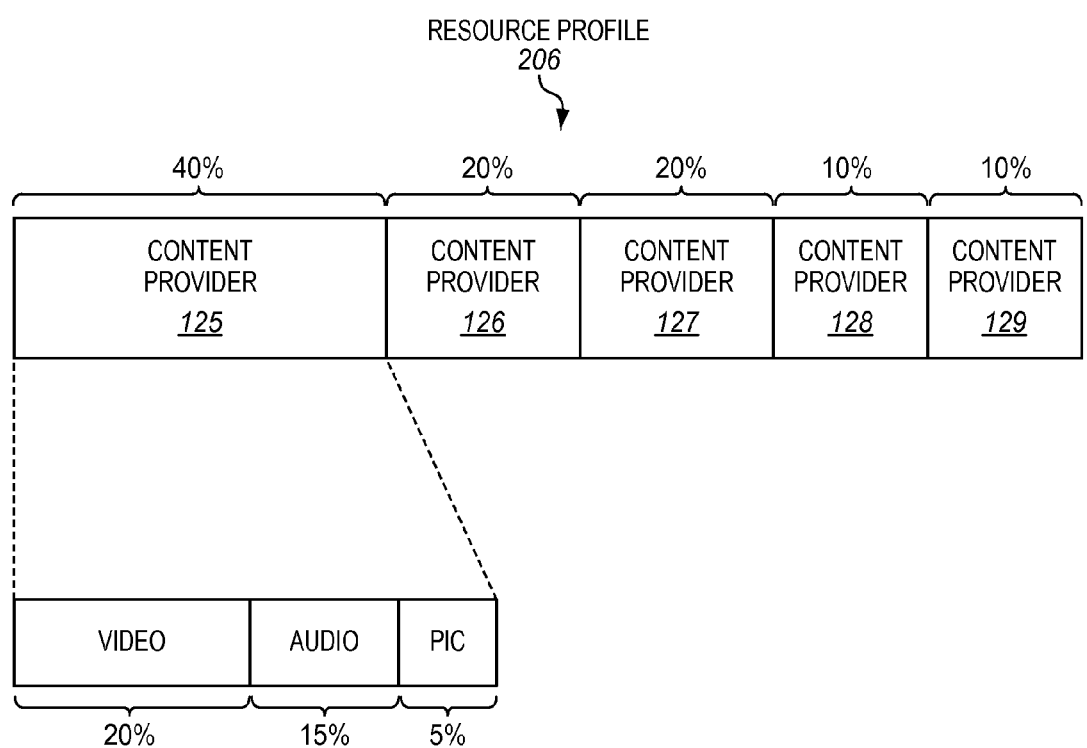
FIG. 4 illustrates a resource profile in an exemplary embodiment.

In step 304, control system 202 accesses a resource profile for the pre-fetch operation, such as profile 206 in memory 204 (see FIG. 2). FIG. 4 illustrates resource profile 206 in an exemplary embodiment. Resource profile 206 indicates content providers 125-129 that have assets for UE 130 to download in advance for the pre-fetch operation. The order of content providers 125-129 in resource profile 206 may indicate a sequence for the pre-fetch operations. The sequence of the content providers 125-129 may be defined based on feedback from the end user when previously requesting assets, and the sequence may be modified by control system 202 based on subsequent requests for assets by the end user.

Resource profile 206 also defines a percentage of UE resources allocated to each of the content providers 125-129 for downloading assets during the pre-fetch operation. The term "percentage of UE resources" may refer to a variety of things. In one example, UE resources may refer to time that is allocated for a pre-fetch operation, such as download time, processing time, air time, etc. For instance, if a pre-fetch operation is scheduled for 30 minutes, then the percentage of UE resources may refer to a percentage of the 30 minutes allocated to download assets from a particular content provider. In another example, UE resources may refer to memory that is allocated for a pre-fetch operation. For instance, if a pre-fetch operation is allowed to use 2 Gigabytes of memory space within the UE, then the percentage of UE resources may refer to a percentage of the 2 Gigabytes allocated to download assets from a particular content provider.

In the embodiment shown in FIG. 4, resource profile 206 specifies that 40% of the UE resources are allocated for downloading assets from content provider 125 during a pre-fetch operation. Resource profile 206 specifies that 20% of the UE resources are allocated for downloading assets from each of content providers 126-127. Resource profile 206 also specifies that 10% of the UE resources are allocated for downloading assets from each of content providers 128-129.

Resource profile 206 may also define the percentage of UE resources allocated per asset-type for a particular content provider. An "asset-type" refers to a type of media that is available for download, such as video, audio, digital pictures, etc. For example, resource profile 206 specifies that 20% of the UE resources allocated to content provider 125 (40% total) are allocated for video, 15% are allocated for audio, and 5% are allocated for digital pictures. Resource profile 206 may define the percentages per asset-type for each of content providers 126-129 in a similar manner. Also, resource profile 206 may define the percentage allocated per sub-asset-type (not shown in FIG. 4), where a sub-asset-type comprises any kind of subset of the asset-type. For example, the sub-asset-type may be the file format of the video, so that the 20% allocated for video may be further defined as 10% for .wmv files and 10% for .mpg files. Asset sub-types may also refer to other things, such as a sub-type of "friends" for a social networking type of content provider.

In step 306, control system 202 downloads the assets from content providers 125-129 based on the resource profile. Control system 202 may download the assets over networks 110 and 120 (such as during low usage periods), which means that the download may occur over the air interface of access network 110. Control system 202 may also download the assets over another type of network, such as a local area network.

Figure 5:
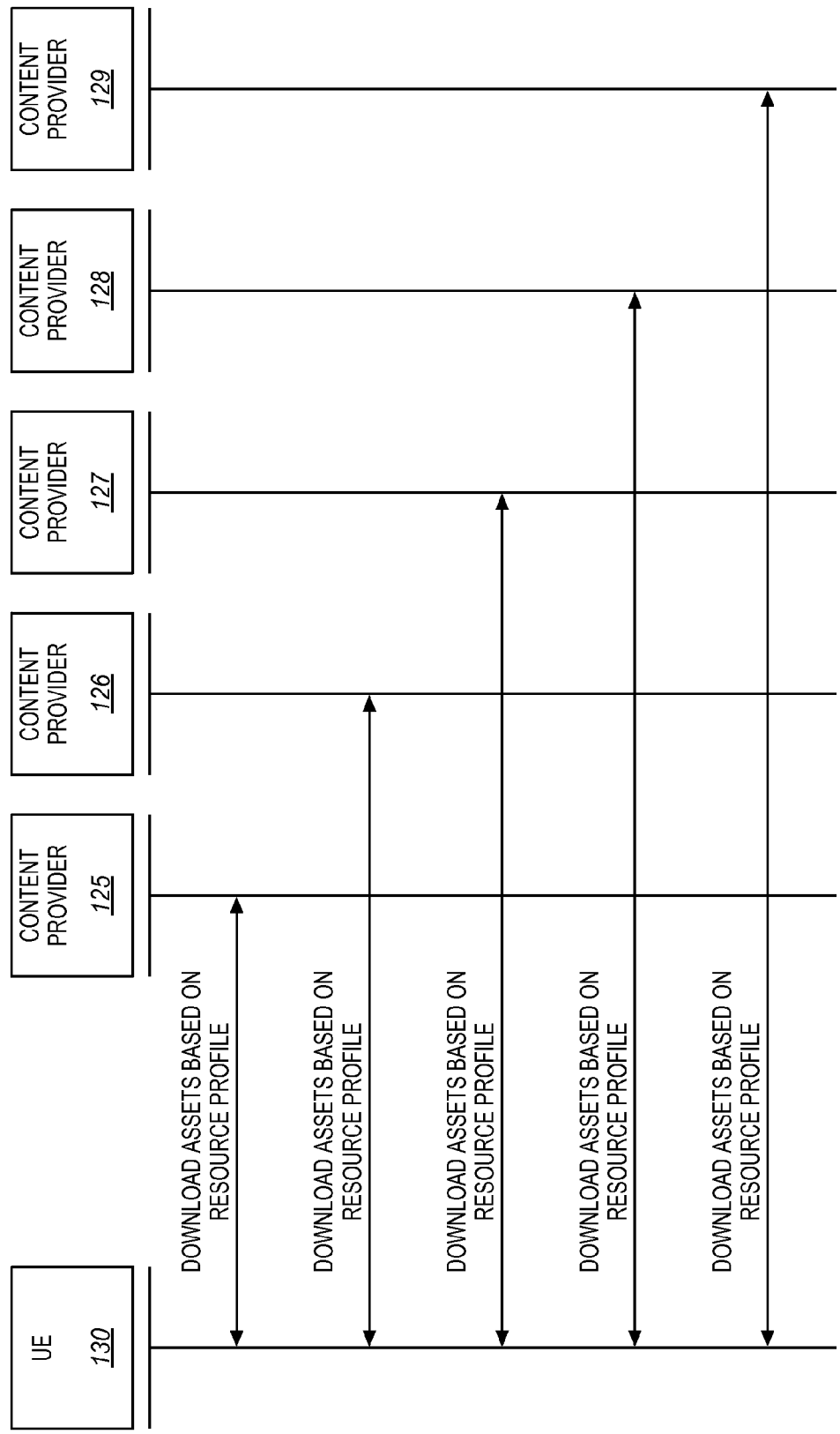
FIG. 5 is a message diagram illustrating a pre-fetch operation in an exemplary embodiment.

FIG. 5 is a message diagram illustrating a pre-fetch operation in an exemplary embodiment. Control system 202 downloads assets from content providers 125-129 based on the percentages allocated in resource profile 206. For example, looking at FIG. 4, control system 202 will spend 20% of UE resources downloading video from content provider 125, 15% of UE resources downloading audio from content provider 125, and 5% of UE resources downloading digital pictures from content provider 125. Control system 202 will also spend 20% of UE resources downloading assets from content provider 126, 20% of UE resources downloading assets from content provider 127, and so on.

UE 130 may optimize the sequence of downloading to make sure the more important asset types to the end user (with the largest allocations) are downloaded first. This may be done to make sure important assets are downloaded before an unforeseen event (e.g., power outage) happens.

In downloading the assets, control system 202 may authenticate itself to a content provider before performing the download. Control system 202 may store authentication information for each of the content providers 125-129 that require authentication. For example, if content provider 125 comprises Facebook, then control system 202 may store a user name and password in order to access a Facebook account for the end user. When downloading the assets, control system 202 sends authentication information (e.g., user name and password) to a content provider 125-129 before downloading assets. When/if control system 202 becomes authenticated by a content provider 125, control system 202 is able to download the assets from the content provider 125-129.

Control system 202 downloads the assets from content provider 125-129 in this manner until the pre-fetch operation has ended, and stores the downloaded assets in memory 204 (step 306). While downloading the assets, there may be instances where a percentage allocated in resource profile 206 would be exceeded by an asset download, so control system 202 does not download that asset. For example, assume that 5% of download time is allocated for digital pictures from content provider 125 (see FIG. 4), and that a download of a digital picture from content provider 125 would exceed the 5% allocation. When this occurs, control system 202 does not download the asset, and is able to carry the unused percentage over to the next pre-fetch operation(s). For example, assume that 5% of download time is allocated for digital pictures from content provider 125 (see FIG. 4), and that control system 202 is about to download a digital picture from content provider 125. Before doing so, control system 202 estimates the time for downloading the digital picture from content provider 125. If control system 202 cannot download the digital picture from content provider 125 within the 5% allocated for download time (based on the estimated time for download), then control system 202 does not download the asset and carries the 5% of download time over to one or more subsequent pre-fetch operations. Percentages may be carried over any time that the UE resources required for a download of an asset exceeds the percentage of UE resources allocated in the resource profile. Control system 202 adjusts the resource profile based on the percentages carried over from prior pre-fetch operations.

When the assets are pre-fetched by UE 130, control system 202 may store the downloaded assets in local memory 204, and generate a list of asset pointers that point to the assets stored locally in memory 204. Thus, when the end user of UE 130 requests to view or otherwise access an asset, control system 202 checks the list of asset pointers to see if the asset is stored in memory 204. If so, control system 202 retrieves the asset from memory 204. Otherwise, the asset is fetched over the network. For example, the end user may launch a web application, and select links to download certain assets from content providers 125-129. The links in the web application comprise URLs. When the end user selects a particular URL, it may point to an asset that is locally stored in memory 204. This is further illustrated in FIG. 6.

Figure 6:
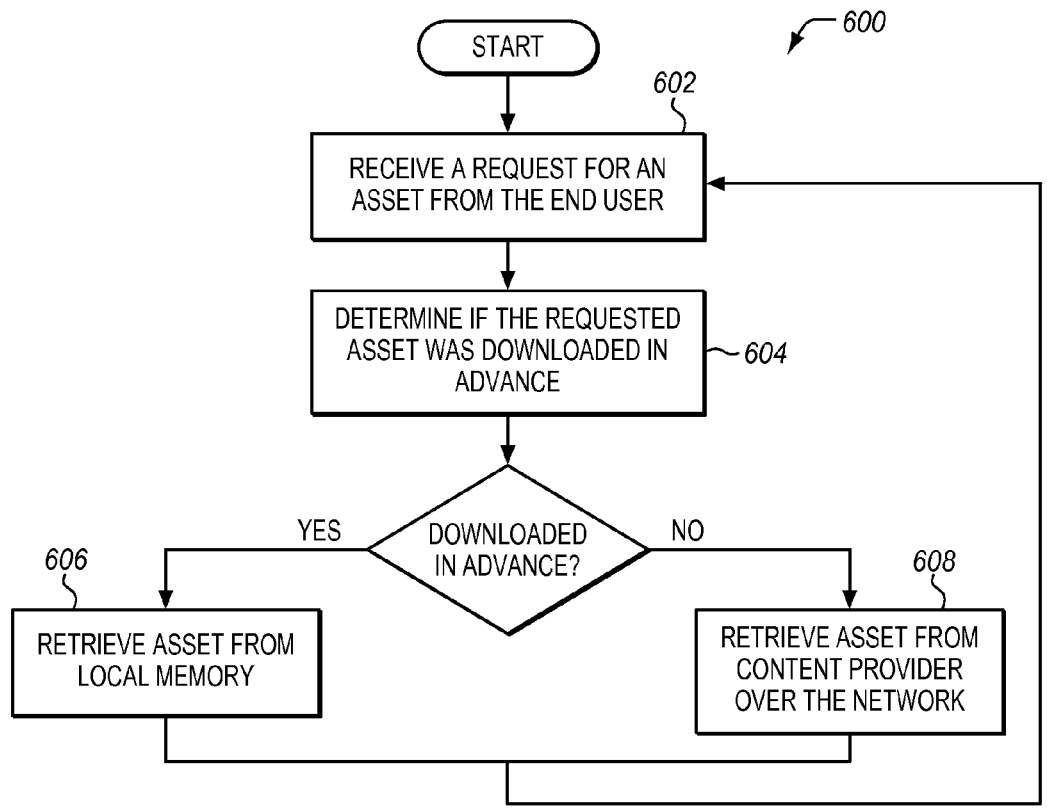
FIG. 6 is a flow chart illustrating a method of handling an asset request in a UE in an exemplary embodiment.

FIG. 6 is a flow chart illustrating a method 600 of handling an asset request in UE 130 in an exemplary embodiment. The steps of method 600 will be described with reference to UE 130 in FIGS. 1-2, but those skilled in the art will appreciate that method 600 may be performed in other systems or devices. In step 602, control system 202 receives a request for an asset from the end user. A request for an asset comprises any type of input from the end user to view or otherwise access an asset. For example, a request for an asset may comprise an end user selecting a link to a YouTube video through a web browser.

In response to the request, control system 202 determines if the requested asset was downloaded in advance during the pre-fetch operation to memory 204 (in step 604). For example, the request for the asset may include a URL. If the pre-fetched assets are each mapped to URLs, then control system 202 is able to search memory 204 for a URL that matches the URL of the requested asset. If there is a match, then control system 202 is able to determine that the requested asset was pre-fetched.

If the requested asset was downloaded in advance (pre-fetched), then control system 202 retrieves the requested asset from memory 204 responsive to the request in step 606. The requested asset may then be viewed or otherwise accessed by the end user. Because the requested asset was pre-fetched and retrieved from memory 204, control system 202 does not have to download the asset in real-time over the network. This advantageously saves network resources; especially the air interface. If the requested asset was not downloaded in advance (not pre-fetched), then control system 202 retrieves the requested asset from a content provider 125-129 over the network responsive to the request in step 608.

In one embodiment, UE 130 is able to monitor which assets are requested by the end user and how the assets are utilized by the end user. For example, UE 130 may monitor how many times the end user requests a particular asset during a time period (e.g., 24 hours), and may monitor how much of the asset the end user accesses during the time period (e.g., watches a 50 minute video for 20 minutes), or may monitor the elapsed time between when the assets was pre-fetched and when the end user accessed the asset. UE 130 is able to use this information about the assets to adjust the resource profile 206 used for future pre-fetch operations.

Figure 7:
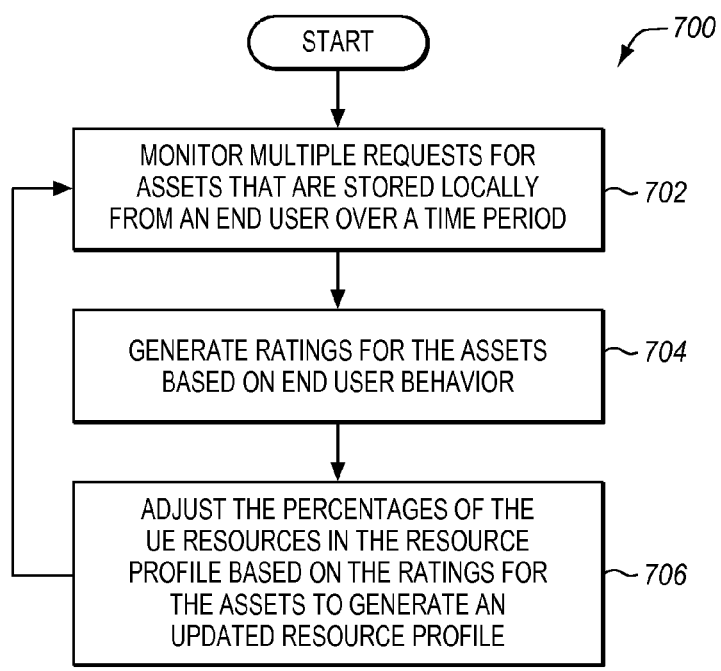
FIG. 7 is a flow chart illustrating a method of updating a resource profile in an exemplary embodiment.

FIG. 7 is a flow chart illustrating a method 700 of updating resource profile 206 in an exemplary embodiment. The steps of method 700 will be described with reference to UE 130 in FIGS. 1-2, but those skilled in the art will appreciate that method 700 may be performed in other systems or devices. In step 702, control system 202 monitors multiple requests for assets from the end user over a time period. This monitoring may also be referred to as receiving feedback from the end user on the assets that are most important to the end user. For example, if an end user watches Video 1 ten times in a day for an average of 30 minutes each viewing, then this interaction by the end user with the asset (Video 1) is considered feedback by the end user on the asset.

In step 704, control system 202 generates ratings for the assets based on the requests (feedback) of the end user. A rating for an asset comprises any classification, grade, or weighted value indicating the value of the asset to the end user. The rating may be based on the number of times the end user requests an asset during the time period. For example, if an end user requests an asset (e.g., YouTube video) three times during a 24 hour period, then this asset may be given a higher rating than if the end user requested the asset only once during the 24 hour period. The rating may also be based on the length of time the end user accesses the asset during the time period. For example, if an end user accesses an asset (e.g., watches the YouTube video) for 60 minutes during a 24 hour period, then this asset may be given a higher rating than if the end user accessed the asset for 10 minutes during the 24 hour period. The rating may also be based on the length of time before the end user accesses the asset after the assets was downloaded. Control system 202 may consider any other data when determining the ratings for the assets.

Figure 8:
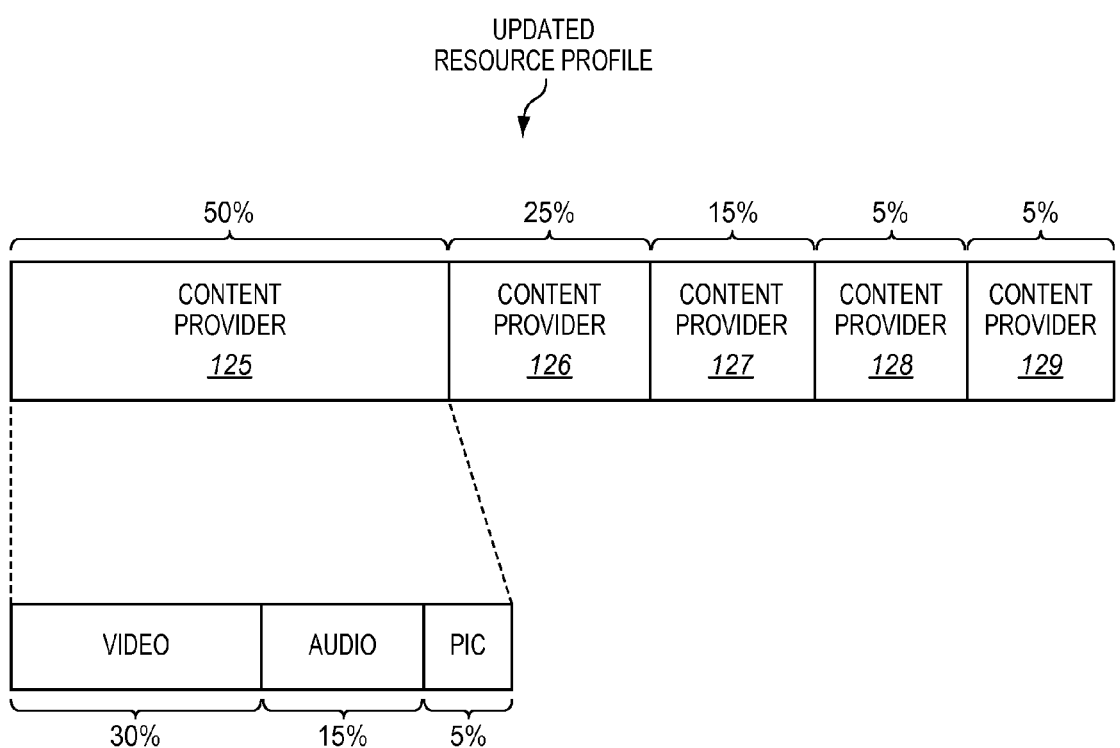
FIG. 8 illustrates an updated resource profile in an exemplary embodiment.

In step 706, control system 202 adjusts the percentages of the UE resources in resource profile 206 based on the ratings for the assets to generate an updated resource profile for use in a subsequent pre-fetch operation. FIG. 8 illustrates an updated resource profile in an exemplary embodiment. Comparing the profiles in FIG. 4 and FIG. 8, the percentage allocated to content provider 125 was adjusted from 40% to 50%. The percentage allocated to content provider 126 was adjusted from 20% to 25%, the percentage allocated to content provider 127 was adjusted from 20% to 15%, and the percentages allocated to content providers 128-129 was adjusted from 10% to 5%. Thus, in the next iteration of a pre-fetch operation, UE 130 will dedicate more resources to pre-fetching assets from content providers 125-126 than in the prior pre-fetch operation.

If the rating of an asset type is positive, then the resource profile will have an increased amount of resources for that asset type. If the rating is negative or no rating, then the resource profile may have a reduced amount of resources for that resource type. The resource profile would be adjusted to make sure it equals 100%.

The next time a pre-fetch operation is triggered, control system 202 accesses the updated resource profile to determine how to allocate resources for the pre-fetch operation. As control system 202 acquires more data regarding the asset requests from the end user, it is able to more accurately update the resource profile. Thus, the resource profile will become optimized for pre-fetch operations so that UE resources are allocated more effectively to download assets that the end user of UE 130 is most likely to request at some point.

In allocating percentages in the resource profile, a minimum percentage is allocated for each asset type and/or sub-asset type of a content provider 125-129. The minimum percentage protects an asset type and/or sub-asset type from dying off. Control system 202 is able to update the resource profile based on a history of asset requests from the end user. The resource profile may also be updated in other ways, such as by a server in the network. If an asset type and/or sub-asset type is not requested by an end user during a time period, then the percentage allocated to that asset type and/or sub-asset type may be reduced in the next updated version of the resource profile. This may continue until the percentage allocated is reduced to zero. Then, this particular asset type and/or sub-asset type will no longer be part of the resource profile and will not be part of the pre-fetch operation. To avoid this problem, a minimum percentage is assigned to particular asset types and/or sub-asset types in the resource profile, such as 0.01%.

Figure 9:
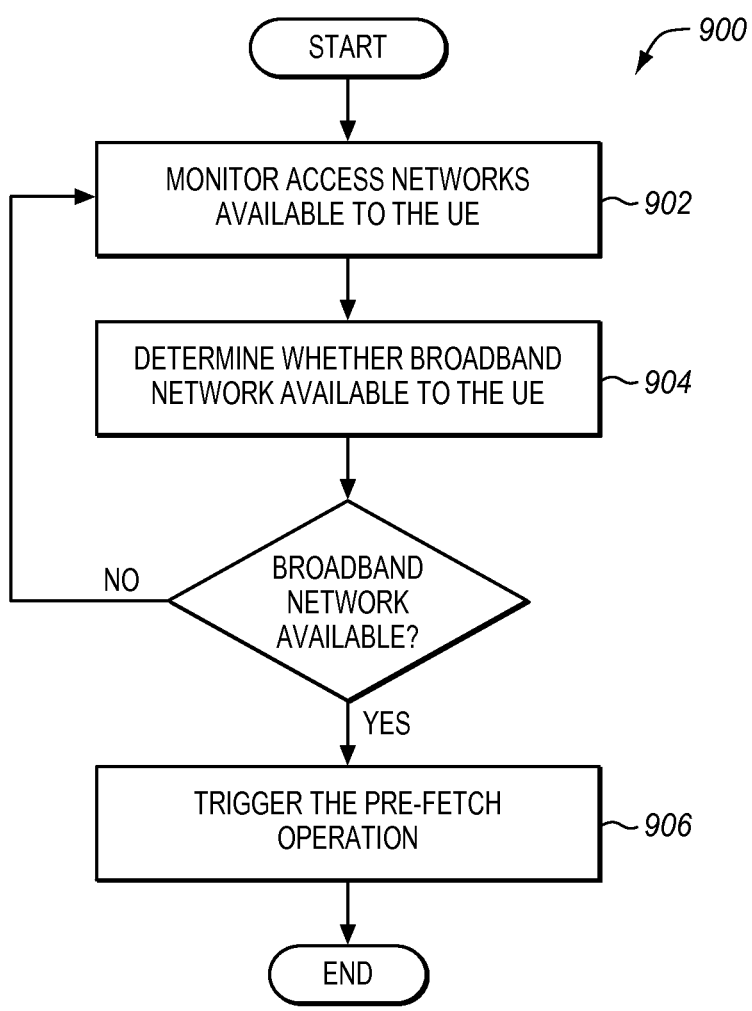
FIG. 9 is a flow chart illustrating a method of triggering a pre-fetch operation in an exemplary embodiment.

As stated above, there may be multiple conditions that trigger a pre-fetch operation. One particular condition is when UE 130 comes into range of a broadband network. FIG. 9 is a flow chart illustrating a method 900 of triggering a pre-fetch operation in an exemplary embodiment. The steps of method 900 will be described with reference to UE 130 in FIGS. 1-2, but those skilled in the art will appreciate that method 900 may be performed in other systems or devices. In step 902, monitor system 208 monitors access networks that are available to UE 130. For example, when the end user is moving around with UE 130 (e.g., driving in a car), UE 130 may come into range of multiple access networks. One assumption in this embodiment is that UE 130 is dual-mode or multi-mode, meaning that UE 130 is able to communicate with different types of networks. For example, UE 130 may be able to communicate with a cellular network (e.g., CDMA or GSM) and with a non-cellular access network (e.g., WiFi). Monitor system 208 then determines whether a broadband network is available to UE 130 in step 904. A broadband network comprises any local network (non-macro network), such as a WiFi network. If a broadband network is available as determined by monitor system 208, then control system 202 triggers the pre-fetch operation within UE 130 in step 906. If not, then monitor system 208 continues to monitor the access networks available to UE 130 (see step 902). Other conditions for pre-fetch operations may be during certain low traffic periods over macro 3G or 4G networks.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP)

hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
   User Equipment (UE) of an end user, the UE having a control system operable to initiate a pre-fetch operation to download assets from content providers in advance of the end user requesting the assets through the UE, wherein the assets comprise content downloadable from content servers of the content providers to the UE for viewing by the end user;
   the control system further operable to access a resource profile for the pre-fetch operation that indicates the content providers that have the assets for the UE to download in advance for local storage on the UE, and defines a percentage of UE resources allocated to each of the content providers for downloading the assets during the pre-fetch operation;
   the control system further operable to download the assets from the content providers based on the resource profile, and store the assets in a memory of the UE,
   wherein the control system is further operable to generate a rating for each of the assets based on at least one of: the number of times the asset was requested during the time period, the length of time the asset was accessed by the end user during the time period, and the time between when the asset was downloaded and when it was accessed by the user, and to adjust the percentages of the UE resources in the resource profile based on the ratings for the assets to generate an updated resource profile for use in a subsequent pre-fetch operation.

2. The system of claim 1 wherein:
   after the pre-fetch operation, the control system is further operable to receive a request for an asset from the end user, and to determine if the requested asset was downloaded in advance in the pre-fetch operation;
   the control system is further operable to retrieve the requested asset from the memory responsive to a determination that the requested asset was downloaded in advance; and
   the control system is further operable to retrieve the requested asset from the content provider over a mobile network responsive to a determination that the requested asset was not downloaded in advance.

3. The system of claim 2 wherein:
   the control system is further operable to monitor multiple requests for assets from the end user over a time period.

4. The system of claim 1 wherein:
   the control system is further operable to store the assets in the memory, and to generate a list of asset pointers to point to the copy of the assets stored locally in the memory.

5. The system of claim 1 wherein the percentage of UE resources allocated to each of the content providers comprises one of:
   the percentage of UE download time allocated to each of the content providers for downloading assets from the content providers during the pre-fetch operation; and
   the percentage of memory allocated to each of the content providers for downloading assets from the content providers during the pre-fetch operation.

6. The system of claim 1 wherein the UE further comprises:
   a monitoring system operable to monitor access networks available to the UE, to determine if a broadband network is available to the UE, and to trigger the pre-fetch operation responsive to the broadband network being available.

7. The system of claim 1 wherein:
   the resource profile has minimum percentage defined for each asset type or sub-type.

8. The system of claim 1 wherein:
   the control system is further operable to send authentication information to the content providers before downloading the assets during the pre-fetch operation.

9. A method performed in User Equipment (UE) of an end user, the method comprising:
   initiating a pre-fetch operation in the UE to download assets from content providers in advance of the end user requesting the assets through the UE, wherein the assets comprise content downloadable from content servers of the content providers to the UE for viewing by the end user;
   accessing a resource profile for the pre-fetch operation that indicates the content providers that have the assets for the UE to download in advance for local storage on the UE, and defines a percentage of UE resources allocated to each of the content providers for downloading the assets during the pre-fetch operation;
   downloading the assets from the content providers to the UE based on the resource profile;
   storing the assets in a memory of the UE;
   generating a rating for each of the requested assets based on at least one of: the number of times the asset was requested during the time period, the length of time the asset was accessed by the end user during the time period, and the time between when the asset was downloaded and when it was accessed by the user; and
   adjusting the percentages of the UE resources in the resource profile based on the ratings for the assets to generate an updated resource profile for use in a subsequent pre-fetch operation.

10. The method of claim 9 wherein after the pre-fetch operation, the method further comprises:
    receiving a request for an asset from the end user into the UE;
    determining, in the UE, if the requested asset was downloaded in advance in the pre-fetch operation;
    retrieving the requested asset from the memory of the UE responsive to a determination that the requested asset was downloaded in advance; and
    retrieving the requested asset from the content provider over a mobile network responsive to a determination that the requested asset was not downloaded in advance.

11. The method of claim 9 further comprising:
monitoring multiple requests for assets from the end user over a time period.

12. The method of claim 9 wherein storing the assets in a memory of the UE comprises:
generating a list of asset pointers to point to the copy of the assets stored locally in the memory.

13. The method of claim 9 wherein the percentage of UE resources allocated to each of the content providers comprises one of:
the percentage of UE download time allocated to each of the content providers for downloading assets from the content providers during the pre-fetch operation; and
the percentage of memory allocated to each of the content providers for downloading assets from the content providers during the pre-fetch operation.

14. The method of claim 9 further comprising:
monitoring access networks available to the UE;
determining if a broadband network is available to the UE; and
triggering the pre-fetch operation responsive to the broadband network being available.

15. The method of claim 9 wherein:
the resource profile has minimum percentage defined for each asset type or sub-type.

16. The method of claim 9 further comprising:
sending authentication information to the content providers before downloading the assets during the pre-fetch operation.

17. A non-transitory computer readable medium tangibly embodying programmed instructions which, when executed by a processor in User Equipment (UE), are operable to pre-fetch assets from content providers to the UE, the method comprising:
initiating a pre-fetch operation in the UE to download assets from the content providers in advance of the end user requesting the assets through the UE, wherein the assets comprise content downloadable from content servers of the content providers to the UE for viewing by the end user;
accessing a resource profile for the pre-fetch operation that indicates the content providers that have the assets for the UE to download in advance for local storage on the UE, and defines a percentage of UE resources allocated to each of the content providers for downloading the assets during the pre-fetch operation;
downloading the assets from the content providers to the UE based on the resource profile;
storing the assets in a memory of the UE;
generating a rating for each of the requested assets based on at least one of: the number of times the asset was requested during the time period, the length of time the asset was accessed by the end user during the time period, and the time between when the asset was downloaded and when it was accessed by the user; and
adjusting the percentages of the UE resources in the resource profile based on the ratings for the assets to generate an updated resource profile for use in a subsequent pre-fetch operation.

18. The medium of claim 17 wherein after the pre-fetch operation, the method further comprises:
receiving a request for an asset from the end user into the UE;
determining, in the UE, if the requested asset was downloaded in advance in the pre-fetch operation;
retrieving the requested asset from the memory of the UE responsive to a determination that the requested asset was downloaded in advance; and
retrieving the requested asset from the content provider over a mobile network responsive to a determination that the requested asset was not downloaded in advance.

* * * * *